June 29, 1937.  O. S. HASKELL  2,085,584
APPARATUS FOR PRODUCING A GAS ATMOSPHERE
Filed April 11, 1934
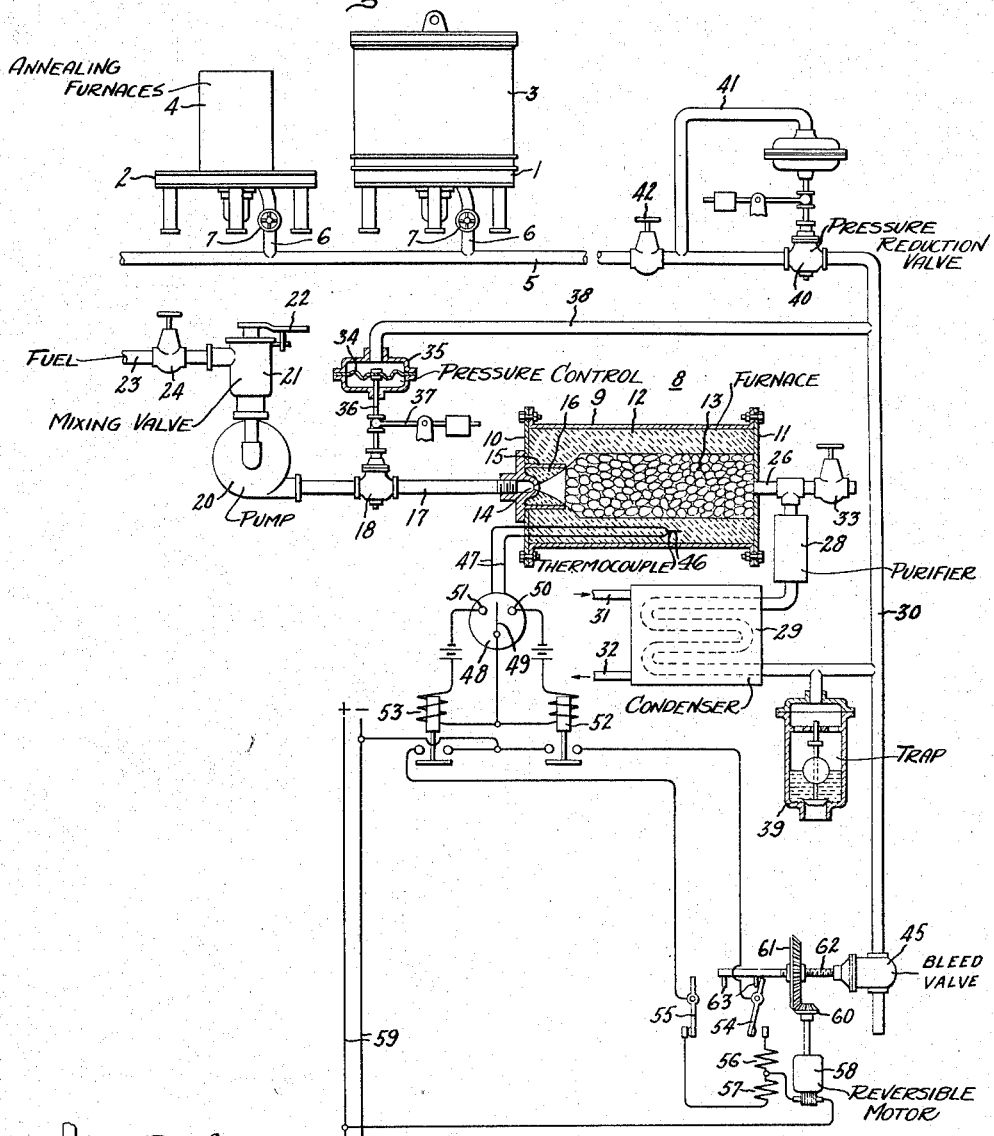
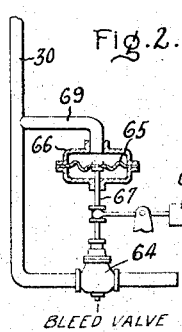
Inventor:
Orin S. Haskell,
by Harry E. Dunham
His Attorney.

Patented June 29, 1937

2,085,584

UNITED STATES PATENT OFFICE 2,085,584

APPARATUS FOR PRODUCING A GAS ATMOSPHERE

Orin S. Haskell, Scotia, N. Y., assignor to General Electric Company, a corporation of New York Application April 11, 1934, Serial No. 720,149

10 Claims. (Cl. 23—281)

My invention relates to the production of a gas which is adapted for use as the surrounding atmosphere for materials being subjected to heat treatment as, for example, in certain annealing processes. More particularly my invention relates to the production of such a gas by the combustion of a mixture of a fuel and air under predetermined temperature conditions, the character of the resulting gas whether it be oxidizing, reducing or neutral being controlled at will in accordance with the desired reaction, if any, between the gas and the materials being treated.

One object of my invention is to provide an improved apparatus for the production of such a gas in which a temperature shall be maintained at all times above a predetermined minimum regardless of the demand made upon the apparatus. Another object of my invention is to provide apparatus of this character which shall operate with a minimum consumption of fuel and with a minimum loss of heat particularly at such times when no demand is being made on the apparatus or when the demand is relatively small.

In accordance with my invention I provide a combustion chamber in which I burn a fuel such, for example, as natural or artificial gas mixed with air, and control the supply of air so as to produce a product having the desired character. The product of this combustion, which for convenience hereafter will be termed "the gas" is withdrawn from the chamber as needed and may be used to form the aforementioned atmosphere.

In order that the proper chemical reaction shall take place in the burning of the fuel within the chamber so that the gas produced shall have the desired composition and also to prevent any possible failure of the fuel to re-ignite after a period of small or no demand for the gas, when the ignition may be lost, it is necessary that the temperature in the chamber shall never fall below a definite minimum, depending on the fuel, which temperature, for example, may be 1000 degrees C. For preventing the temperature of the chamber from falling below said minimum when there is no demand for the gas or when the demand is so small that there is insufficient heat produced in the chamber to preserve the minimum temperature therein, I have provided means for automatically causing heat to be supplied to the chamber. Preferably I bring about this result by allowing some of the gas to escape from the chamber into the atmosphere thereby increasing the rate of fuel combustion in the chamber since the rate of the fuel supply is controlled by the demand for the gas. In one form of my invention I control the escape of the gas by means responsive to the temperature of the combustion chamber; in another form, I control the escape of the gas by means responsive to the pressure in the chamber.

My invention will be better understood from the following description taken in connection with the accompanying drawing, and its scope will be pointed out in the appended claims.

Referring to the drawing, Fig. 1 is a combined diagrammatic view and circuit diagram illustrating the one form of my invention, and Fig. 2 illustrates the other form thereof.

While the gas produced by the apparatus involving my invention may be used for various purposes, I have chosen to illustrate the apparatus as connected to supply the atmosphere which, for example, may be non-oxidizing for a plurality of annealing furnaces 1 and 2. These furnaces are shown as being of the well known bell type, furnace 1 having the bell 3, provided with suitable electric heating means, in place and furnace 2 having the bell removed and showing the material 4 which is ready for heat treatment or which may have been treated. The gas for the atmosphere is supplied to the furnaces from the header 5 by the branch pipes 6 each provided with a control valve 7.

The gas for use in the furnaces 1 and 2 is produced by the burning of fuel in the combustion chamber 8 which is shown comprising the outer casing 9 to which are bolted the end heads 10 and 11. The casing 9 is provided with the lining 12 of heat refractory material and the space within the lining in which combustion of the fuel takes place is nearly filled with a mass 13 of fragments of heat refractory material which, for example, may be similar to that of which the lining is constructed and preferably is a catalyst brick. Secured in the end head 10 is the nozzle 14 by which the fuel mixture is supplied to the chamber. This nozzle is of well known form being provided with a cylindrical portion 15 which has a lining 16 of refractory material forming a flared opening opposite the discharge opening of the nozzle. The fuel mixture to be burned in the chamber is supplied to the nozzle by the pipe 17 controlled by the throttle valve 18.

Various means may be employed for mixing the fuel and air and for supplying it at the proper pressure to the nozzle. In the present case I have illustrated such means as comprising the centrifugal pump 20 to the intake side of which is connected the mixing valve 21 having the adjusting handle 22 and having suitable air inlet openings, not shown. Fuel, such for example as artificial or natural gas, is supplied to the mixing valve 21 by the pipe 23 through the shut-off valve 24. A mixing valve and associated pump such as I have illustrated is disclosed in United States Letters Patent 1,404,211 of January 24, 1922. By adjusting the position of the handle 22 on the mixing valve the proportion of fuel and air may be varied at will whereby the gas produced may be oxidizing, reducing or neutral in character, the mixture being supplied at a definite pressure to the burner under the control of the throttle valve 18.

The gas thus produced in the chamber as a result of the fuel combustion is withdrawn from the chamber by the pipe connection 26 secured to the end head 11 and by suitable other pipe connections it passes through the purifier 28 and then through the cooler 29 into the pipe 30. The purifier is provided when a reducing or a neutral gas is desired for the purpose of extracting any small quantity of oxygen which may be left in the gas notwithstanding the fact that the fuel mixture supplied to the chamber may contain insufficient air for complete combustion of the fuel. It may contain any suitable reducing means such, for example, as small bits or shavings of copper which by being heated to a high temperature by the gas readily combine with any oxygen present therein. The cooler 29 is shown provided with inlet and outlet connections 31 and 32 by which water may be caused to circulate therethrough and thus not only reduce the temperature of the gas being withdrawn from the chamber but also to condense out a portion of the moisture therein, the gas upon leaving the cooler thereby being in a condition of saturation at the temperature of the cooling water. Water thus condensed in the cooler is removed by the trap 39 which may be of any well known form and is illustrated as of the float valve type. For the purpose of initially lighting the gas mixture in chamber 8 I have provided the valve 33 which is normally maintained closed.

The throttle valve 18 by which the fuel mixture is supplied to the chamber at a rate determined by the demand for the gas is shown operated by the pressure responsive device comprising the diaphragm 34 in casing 35, the diaphragm being connected to the valve by the stem 36 to which is attached the counterweight lever 37. The pressure within the casing 35 above the diaphragm is varied in accordance with the pressure within the chamber 8. For this purpose the pipe 38 by which pressure is brought to the casing 35 may connect directly with the interior of casing 8 but for greater convenience, I prefer to connect this pipe with the pipe 30 in which the gas pressure, neglecting the slight friction loss of the purifier, cooler, and connection therewith, is the same as that in the casing and varies in accordance therewith. Thus as the pressure decreases in pipe 30 in response to an increased demand for the gas, the diaphragm 34 rises to open the throttle valve to admit more fuel to the combustion chamber. Likewise when the pressure in the pipe increases due to a lessening of the demand the throttle valve closes to check the supply of fuel.

Between the pipe 30 and the header 5 I have shown the pressure reducing valve 40 which together with the operating mechanism therefor may be similar to the throttle valve 18 and its operating mechanism, the upper side of the diaphragm in this case being in communication through pipe 41 with the header 5 whereby gas is admitted to the header 5 at such rate by the valve 40 as to maintain a predetermined gas pressure in the header. In the header 5 I have shown the valve 42 by which all gas flow through the header may be controlled.

In order to release the gas from the combustion chamber when the demand therefor is too small to maintain the chamber at the desired temperature, as explained above, I have provided the bleed valve 45 which in that form of my invention illustrated by Fig. 1 is controlled in accordance with the temperature of the combustion chamber. For that purpose I have provided the thermocouple 46 which is shown as being imbedded in the lining of the chamber and which by apparatus now to be described causes the valve 45 to open or close in accordance with the temperature of the chamber.

The thermocouple connects through the wires 47 with the galvanometer 48 which has a single movable contact 49 adapted to engage one or the other of the fixed contacts 50 and 51. These fixed contacts connect respectively with the windings of the relays 52 and 53 whose contacts in turn connect through the limit switches 54 and 55 with the field windings 56 and 57 of the reversible valve motor 58, power being supplied to the motor from the source of supply 59. Windings 56 and 57 are reversally wound whereby they cause opposite rotation of the motor armature. The motor 58 serves to open and close the bleed valve 45 and is shown connected therewith through the bevel pinion 60 and the bevel gear 61 which latter is threaded on the valve stem 62 whereby rotation of the gear 61 moves the stem in and out of the valve to close and open the same. On the valve stem 62 are the lugs 63 by which the limit switches 54 and 55 are operated.

When an annealing furnace such as that shown in Fig. 1 is being purged of air preparatory to a heat treatment run, the demand for the gas is relatively large so that the temperature of the combustion chamber 8 is well above the minimum value at which it must be maintained for insuring the proper chemical reaction therein and to prevent loss of ignition. When the purging process is completed and the demand for combusted gas is only that necessary to maintain a slight pressure within the furnace and to replenish any of the gas atmosphere which may be lost through small leaks in the furnace, the amount of fuel admitted to the combustion chamber by the throttle valve is too small to maintain the required temperature in the chamber, which temperature as mentioned above may, for example, be 1000° C.

As the temperature of chamber 8 decreases and approaches this critical temperature the thermocouple 46 operates the galvanometer 48 to cause contact 49 to engage contact 51 thereby closing the circuit relay 53. The operation of this relay in turn closes the circuit of the motor armature through field winding 57. The motor then turns in a direction to move the valve stem to the left thereby opening bleed valve 45. By the same movement the valve stem limit switch 54 is closed and limit switch 55 is opened. By reason of the opening of bleed valve 45 the back pressure in pipe 30 and chamber 8 is somewhat reduced whereby the throttle valve 18 is again opened to admit more fuel to the chamber. The resulting increased combustion in chamber 8 raises the temperature thereof until the thermocouple causes the galvanometer contact 49 to disengage contact 51 and subsequently to engage contact 50. Relay 52 thereupon operates to again energize the motor 58 through the other field winding 56 and the limit switch 54 which in the meantime has become closed. The motor now operates in the reverse direction and closes the bleed valve 45. By this movement the limit switches are returned to their original positions. Again the temperature of the chamber begins to fall and the above described cycle of operation is repeated.

In the modified form of my invention shown by Fig. 2 the bleed valve 64 is operated in response to a change in pressure in the pipe 30, the pressure in which, it will be understood, varies in the same manner as the pressure in the combustion chamber. The bleed valve 64 is shown operated by a pressure actuated mechanism similar to that which actuates the throttle valve 18 and includes the diaphragm 65 in the casing 66 connected with the valve through the stem 67 and counterweighted at 68, the casing 66 being connected to pipe 30 by pipe 69. The bleed valve 64 while illustrated as being similar to throttle valve 18 is constructed to operate in the reverse manner thereto, for as valve stem 67 descends in response to an increase in pressure in pipe 30, valve 64 is constructed to open rather than close.

With the modified form of the apparatus shown in Fig. 2 as long as the demand for gas is relatively large, as when a furnace is being purged, the resulting lowered pressure in pipe 30 allows the bleed valve 64 to remain closed. When the demand for gas, however, is so light that the temperature of the combustion chamber would not be maintained at the necessary value, the increased pressure in pipe 30 moves the valve stem 67 of valve 64 downward to open the bleed valve and allow gas to escape from the chamber to atmosphere. Valve 64 and its operating mechanism is so constructed that sufficient gas is allowed to escape the valve to insure a proper temperature being maintained in the combustion chamber, it being understood that in this form of the invention no apparatus is employed which is directly responsive to the temperature of the combustion chamber for the control of the escape of gas from the chamber.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. In combination, a combustion chamber, means responsive to the pressure therein for supplying fuel thereto, means by which the gas produced in the chamber may be withdrawn therefrom as needed and means for preserving a temperature in said chamber above a predetermined minimum comprising gas releasing means arranged to release gas from said chamber when the demand for gas is so small that the resulting heat of combustion in the chamber is insufficient to maintain the chamber at said temperature.

2. In combination, a combustion chamber, means responsive to the pressure therein for supplying fuel thereto, means by which the gas produced in the chamber may be withdrawn therefrom and means for preserving a temperature in said chamber above a predetermined minimum comprising a valve arranged to release gas from said chamber into the atmosphere and means responsive to a slight elevation of pressure in said chamber for opening said valve.

3. In combination, a combustion chamber, means responsive to the pressure therein for supplying fuel thereto, means by which the gas produced in the chamber may be withdrawn therefrom and means for preventing the temperature in said chamber from falling below a predetermined minimum comprising a valve arranged to release gas from said chamber into the atmosphere and a pressure responsive device for opening said valve when the gas pressure in the chamber rises to such a value that insufficient fuel is supplied to the chamber to maintain said temperature.

4. In combination, a combustion chamber, means for supplying thereto a mixture of fuel and air, a valve for controlling the supply of said mixture to the chamber, a pipe for withdrawing the gas produced in the chamber, a device responsive to the pressure in the chamber for controlling said valve, a bleed valve connected to control the escape of gas from the chamber to the atmosphere and means for operating said bleed valve in response to a predetermined minimum temperature of the chamber.

5. Apparatus for supplying a non-oxidizing gas to a furnace for the initial purging thereof and for the subsequent small demand thereof comprising a combustion chamber connected therewith, means for supplying a fuel mixture to the chamber, means responsive to the pressure in the chamber for controlling the supply of said mixture thereto, the heat resulting from said small demand being insufficient to maintain a required minimum temperature in said chamber and means responsive to a predetermined drop in temperature of said chamber for bleeding gas therefrom into the atmosphere thereby causing an increase in the amount of the fuel mixture supplied to the chamber.

6. Apparatus for supplying a non-oxidizing gas to a furnace for the initial purging thereof and for the subsequent small demand thereof comprising a combustion chamber connected therewith, means for supplying a mixture of fuel and air to the chamber, means for varying the proportion of air in said mixture, a valve responsive to the pressure in said chamber for regulating the supply of the mixture thereto, a pipe connection for conveying the gas from the chamber to a furnace, a purifier and a cooler included in said pipe connection, a water trap connected therewith, a bleed valve for releasing gas from said connection, a thermo-couple associated with said chamber and mechanism including a reversible motor responsive to said thermo-couple for operating said bleed valve.

7. Apparatus for producing a protective gas atmosphere containing moisture for use in furnaces comprising means for mixing air and a hydrocarbon gas in predetermined proportions, walls forming a combustion chamber for said gaseous mixture, conduit means for supplying said gaseous mixture to said combustion chamber to thereby produce a burned gas, a cooling device for said burned gas, means for cooling said device to a temperature not lower than the freezing temperature of water, means for passing said burned gas from said combustion chamber through said cooling device whereby a portion of the moisture in said burned gas is condensed out, and means responsive to the pressure of said burned gas for controlling the admission of said mixture to said combustion chamber.

8. Apparatus for producing a gas containing moisture for use as a protective atmosphere in furnaces comprising means for mixing air and a hydrocarbon gas in predetermined proportions, means for maintaining said gaseous mixture under pressure, heat refractory walls forming a combustion chamber, conduit means including a valve for supplying said gaseous mixture to said combustion chamber to thereby produce a burned gas, a purifying device for removing oxygen from said burned gas, means for passing the hot burned gas from said combustion chamber to said purifying device whereby said purifying device is heated by said gas to effect the removal of oxygen therefrom, and means responsive to the pressure of said burned gas for controlling the admission of said mixture to said combustion chamber to thereby maintain said burned gas at a predetermined pressure.

9. Apparatus for producing a gas containing moisture for use as a protective atmosphere in furnaces comprising walls forming a combustion chamber, means for mixing a hydrocarbon fuel and air in predetermined proportions and supplying said mixture under pressure to said combustion chamber to thereby produce a burned gas, a purifier for removing oxygen from said gas, means for passing the hot burned gas from said combustion chamber to said purifier whereby said purifier is heated by said gas to effect the removal of oxygen therefrom, a cooling device for said gas, conduit means for passing the gas through said cooling device whereby a portion of the moisture in said gas is condensed out, conduit means for conveying said gas from said cooling device to the furnace, and means responsive to the pressure of said gas for controlling the admission of said mixture to said combustion chamber to thereby maintain a predetermined gas pressure.

10. Apparatus for producing a gas containing moisture for use as a protective atmosphere in furnaces for carrying out metallurgical operations comprising means for mixing air and a hydrocarbon gas in predetermined proportions, means for maintaining said gaseous mixture under a predetermined pressure, heat refractory walls forming a combustion chamber, conduit means including a valve for supplying said mixture to said combustion chamber to thereby produce a burned gas containing moisture, a purifying device for removing oxygen from said burned gas, conduit means for passing the hot burned gas from said combustion chamber to said purifying device whereby said purifying device is heated by said gas to effect the removal of oxygen therefrom, a cooling device for said gas, conduit means for passing said gas from said purifying device through said cooling device, whereby a portion of the moisture in said gas is condensed out, a water trap for said cooling device, and means responsive to the pressure of said burned gas for controlling said valve to thereby maintain said gas at a predetermined pressure.

ORIN S. HASKELL.